Oct. 3, 1967  S. P. BESSMAN  3,344,801

GRADIENT GENERATOR

Filed Nov. 7, 1966

OPERATION OF GRADIENT ELUTION DEVICE

VOLUME WITHDRAWN

United States Patent Office 3,344,801
Patented Oct. 3, 1967

3,344,801
GRADIENT GENERATOR
Samuel P. Bessman, 1410 Woodcliff Ave.,
Catonsville, Md. 21228
Filed Nov. 7, 1966, Ser. No. 592,375
6 Claims. (Cl. 137—263)

ABSTRACT OF THE DISCLOSURE

The invention relates to a linear gradient generator comprising a vertically disposed cylindrical mixing chamber and a plurality of vertically disposed cylindrical storage chambers connected to the mixing chamber. Each storage chamber is at a different relative elevation. The cumulative volume of the storage chambers equals the volumetric capacity of the mixing chamber. When filled, the various chambers are all under the same hydrostatic head. Withdrawal of fluid from the mixing chamber results in a linear gradient for the change in concentration of whatever may be dissolved in the mixed fluid being withdrawn.

---

The present invention relates to gradient generation for a fluid stream. Often in medical and biochemical experimentation and testing, concentration gradients of preselected configuration are desired: for example workers in the art often wish to gradually change, color, ionic concentration of a fluid stream. Generally a gradient composed of sequential linear segments is desired.

One standard method for generating a single linear gradient involves employment of a mixing chamber and a storage chamber having equal cross-sectional areas at corresponding horizontal levels. The two chambers are interconnected side by side so that as liquid is withdrawn from the mixing chamber, an equal volume of liquid from the storage chamber enters the mixing chamber. As mixed fluid is drawn from the bottom of the mixing chamber, more fresh fluid flows from the storage chamber into the bottom of the mixing chamber to restore the hydrostatic balance in the two chambers. Ultimately, the last fluid withdrawn is almost entirely liquid from the storage chamber. The instance where equal volumes are present in mixing and storage chamber and the two are otherwise identical (cross section and elevation) is a limiting instance in fluid flow wherein the character (i.e., ionic concentration color, etc.) of the flowing stream changes linearly from what existed in the filled mixing chamber to what existed in the filled storage chamber. However, this gradient is quite specific and cannot be changed in its course to provide sequential linear or non-linear changes. Mechanically complex systems have been suggested for obtaining both linear and non-linear gradient changes by means of programmed pumping systems mechanical or electronic valves, or series connected multiple mixing chambers.

The object of the present invention is to provide an uncomplicated arrangement which permits generation of a wide variety of gradients.

A further object of the invention is to provide a flexible gradient generator operated solely by a hydrostatic head.

A further object is to provide a hydrostatic mechanism for sequential delivery of batches of different solutions.

Figure 1:
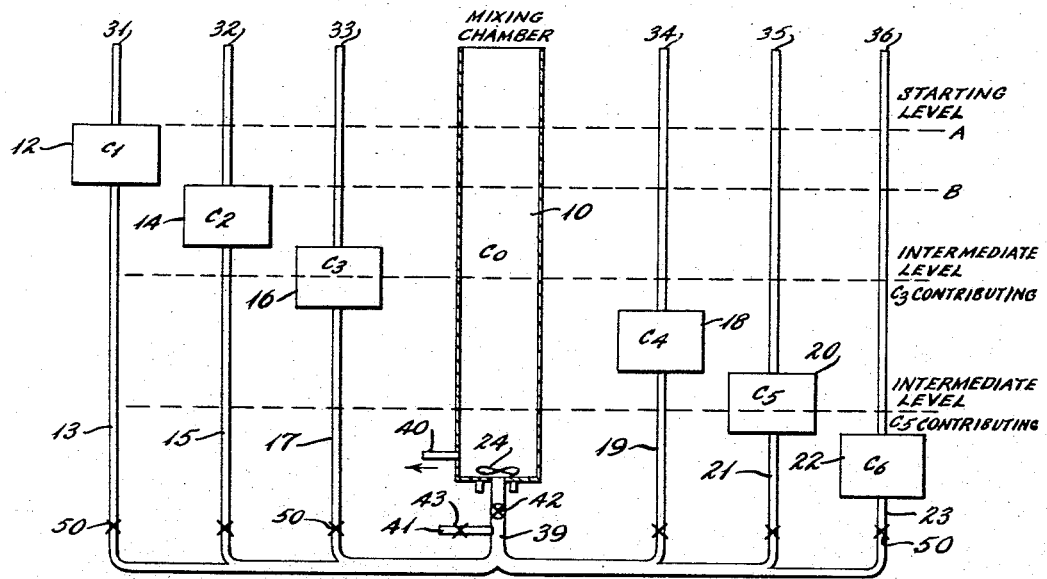
Figure 2:
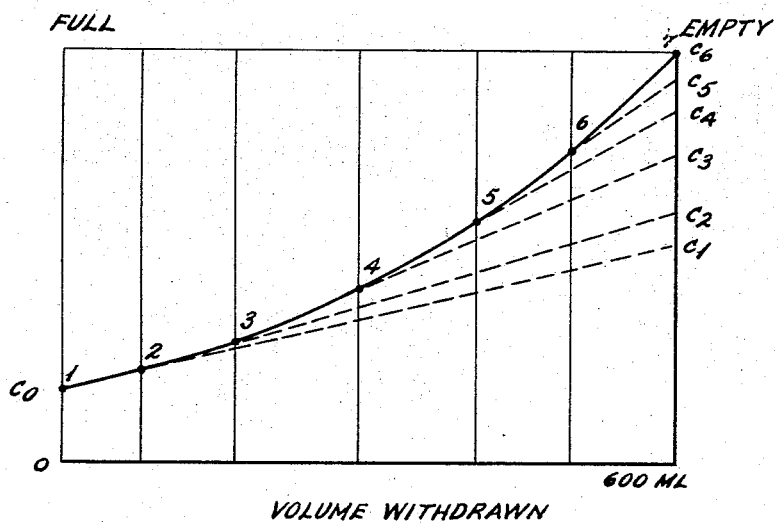

Other objects and the advantages of the present invention will become apparent from the description thereof which follows, now being made to the attached drawing wherein:

FIG. 1 diagrammatically illustrates the structure of the gradient generator; and FIG. 2 is a graph illustrating how a non-linear gradient may be obtained with the device of the present invention.

The gradient generator comprises an upright cylindrical mixing chamber 10 and two or more upright cylindrical storage chambers (six being illustrated) 12, 14, 16, 18, 20 and 22. If each segment of the gradient is to be linear there must be equal cross-sectional area for each storage chamber and the same cross-sectional area in mixing chamber 10. Importantly also, each of the storage vessels is connected either directly or through a manifold 39 to mixing chamber 10 by conduits wide enough for free flow of fluid from storage chamber to mixing chamber 10. Preferably each storage chamber has its own conduit 13, 15, 17, 19, and 23 leading to manifold 39 which in turn leads to mixing chamber 10. A stirrer 24 is provided in mixing chamber 10 to admix the liquid and maintain uniformity in mixing chamber 10. Also, each storage chamber 12, 14, 16, 18, 20 and 22 has a standpipe 31, 32, 33, 34, 35 and 36 respectively leading up to a level above the starting liquid level in mixing chamber 10. These standpipes 31, 32, 33, 34, 35 and 36 serve to place all portions of the gradient generator under the same hydrostatic head and to maintain throughout a uniform hydrostatic head as mixing chamber 10 empties.

In the arrangement illustrated in the drawing the top of storage chamber 12 is on a level (same horizontal plane) as the filled liquid level in mixing chamber 10. The lower inside surface of storage chamber 12 lies in the same horizontal plane as the upper inside surface of the next storage chamber 14, with this relation following downward from chamber (16, 18, etc.) to chamber until the bottom of chamber 22 is on a level (same plane) with the bottom of mixing chamber 10. When the gradient generator is filled to the starting level liquid extends in standpipes 32, 33, 34, 35 and 36 up to the starting level. Then, as fluid is withdrawn from mixing chamber 10 the liquid level in the storage chambers falls correspondingly as liquid flows from each storage chamber to the mixing chamber so as to maintain hydrostatic balance in the system. However, as may be seen from FIG. 1, the actual amount of liquid that flows from each storage chamber between any two levels depends upon the cross-sectional area at the meniscus in the chamber or its standpipe. Removing enough liquid from mixing chamber 10 via line 40 to draw down from the starting level A to level B (corresponding to the lower inside surface or bottom of storage chamber 12) draws down also the level of the liquid in standpipe 32, 33, 34, 35, 36 and all the liquid originally present in storage chamber 12. The liquid drawn from storage chamber 12 and the standpipes passes, of course, into mixing chamber 10. However, as fluid is initially drawn from mixing chamber 10 via outlet 40, the drop in fluid level in standpipes 32, 33, 34, 35 and 36 actually contributes little volume to the flow into the mixing chamber 10, while the drop in the liquid level of chamber 12 contributes virtually all of the liquid flow to the mixing chamber. At this state (i.e. level A to level B) only the volume of liquid contained in the several standpipes between level A and level B is contributed by the other storage vessels 14, 16, 18, 20 and 22. As fluid continues to be withdrawn and the liquid in mixing chamber 10 drops below level B storage chamber 14 then contributes essentially all of the fluid flow to mixing chamber 10. In turn storage chamber 16, 18, 20 and 22 sequentially make their contribution to mixing chamber 10 as apparatus drains. As a practical matter the amount of fluid which enters mixing chamber 10 from standpipes 32, 33, 34, 35 and 36 and conduits 13, 15, 17, 19 and 21 can be ignored. With use of narrow tubing, standpipes can contain little liquid. In a typical apparatus constructed according to the present invention where plastic and glass tubing are employed for the outlet conduits and the standpipes the ratio of their combined cross-sectional area to that of mixing chamber 10 (which is the same as that of the storage chambers) is about 1:256. The small areas involved in these tubes causes them to contribute a negligible amount of liquid compared to what is contributed in turn by each storage chamber.

A typical installation constructed according to practice of the present invention might be formed out of glass or plastic vessels and tubing and mounted on a board to actually look like the diagrammatic representation of FIGURE 1. Rubber tubing can connect the bottom inlets to mixing chamber 10 to the bottom outlets of the several (at least two) storage chambers and clamps 50 (diagrammatically indicated on the drawing) placed on the rubber tubing to seal off mixing chamber 10 from each storage chamber (12–22) while the system is being filled. A conventional magnetic stirrer 24 may be employed to mix the liquid in the mixing chamber, or it may be mixed by a stirrer from above.

Practice of the present invention contemplates placing a different solution (e.g. ionic concentration, color, etc.) in each storage chamber and in the mixing chamber. A high degree of flexibility is inherent in the gradient generator, permitting two or more gradients to be established concurrently, or sequentially. Non-linear gradient curves of a smooth nature (as is illustrated in FIGURE 2) may be closely approximated with an arrangement having a number (e.g. 6) of storage chambers each of which can provide a linear segment. The gradient may be increased, then decreased. The many possible gradients are obtained by appropriate selection of solution employed in each storage chamber, according to the desired effect of admixture with the liquid in mixing chamber 10. The entire operation with production of the desired gradient occurs simply by drawing out solution via line 40. Among the possible variations which may be noteworthy are employment of the same solution in mixing chamber 10 and some of the storage chambers, or even blocking out a storage chamber.

Blocking mixing chamber 10 out of the system may be done for the special case expedient where a step wise gradient is desired. This requires manifolding of the outlets from storage chambers 12–22 into manifold 39, presence of an outlet 41 therein (normally closed by valve 43) and a valve 42 which can close off the flow to mixing chamber 10. Then flow from the several storage chambers via manifold 39 and outlet 41 (while valve 42 closes off fluid flow to mixing chamber 10), results in sequential emptying of the several mixing chambers via line 41 and thereby a step wise change in the character of the flowing fluid.

Advantageously for the preparation of linear gradients each storage chamber has the same volume and the combined volume of the storage chambers is equal to the volume of liquid in the mixing chamber 10 (at starting level). This relation is obtained when the top of storage container 12 is coplanar with the starting level and the inside bottom surface is coplanar with the top surface of container 14, which in turn has its bottom coplanar with the top of storage container 16, the same container to container relation, existing until the last storage container 22, whose inside bottom surface is coplanar with the bottom of mixing chamber 10. From 3–10 equal storage chambers having in total the same volume as provided in the mixing chamber is believed to provide an optimum degree of flexibility and such constructions are preferred embodiments of this invention.

To further illustrate a preferred practice of the patent invention the following example of gradient generation is provided.

The rigid plastic mixing chamber has an inside diameter of 2″ and an overall volume of 300 ml. and six storage vessels as shown in FIGURE 1 are provided with an inside diameter of 2″ and volumes of 50 ml. each; the combined volume is 600 ml. A magnetic stirrer maintains the solution in the storage chamber thoroughly admixed at all times.

When a non-linear gradient curve as shown in FIGURE 2 is desired, a chordal approximation of this curve is obtained over the 600 ml. volume by marking off as points 1, 2, 3, 4, 5, 6, 7 the intersection of the curve with the 0; 100; 200; 300; etc. ml. lines over the 600 ml. scale from full to empty as shown. Extending the several lines 1–2, 2–3, 3–4, etc., to the 600 ml. axis as shown provides the concentrations ($C_1$) ($C_2$), which are to be employed in the six storage vessels ($C_1$ in 12, $C_2$ in 14 etc.) to obtain the desired concentration gradient over the 600 ml. as solution is withdrawn from the storage vessel.

Since the apparatus in all variations functions under a hydrostatic principle all of the chambers can be connected at the upper openings and gas or air pressure can be applied. The shapes of the gradient or step wise concentration changes will not be affected.

Frequently the gradient curve desired is not so complex as illustrated in FIGURE 2, being for example a straight line increase, or decrease, a "V," a step shape etc. The gradients are, of course, predetermined by the concentrations in the mixing and storage chambers and may be calculated. For instance in a system involving three storage vessels, and a mixing chamber, the effluent concentration determination is as follows where:

$C_{EA}$=concentration of effluent when reservoir A empties
$C_{EB}$=concentration of effluent when reservoir B empties
$C_{EC}$=concentration of effluent when reservoir C empties
$C_A$, $C_B$, $C_C$, $C_M$ are concentrations in reservoirs A, B, C, and mixing chamber
$V_A$, $V_B$, $V_C$=volumes delivered from reservoirs A, B, and C
$V_M$=initial volume of mixing chamber $$(1) \quad C_{EA} = C_A \frac{V_A}{V_M} + C_M \left(1 - \frac{V_A}{V_M}\right)$$

$$(2) \quad C_{EB} = C_B \frac{V_B}{V_M - V_A} + C_{EA} \left(1 - \frac{V_B}{V_M - V_A}\right)$$

$$(3) \quad C_{EC} = C_C \frac{V_C}{V_M - V_A - V_B} + C_{EB} \left(1 - \frac{V_C}{V_M - V_A - V_B}\right)$$

To find $C_A$, $C_B$, $C_C$, or $C_M$ for required effluent pattern $$(4) \quad C_A = \frac{V_M}{V_A} \left[C_{EA} + C_M \left(\frac{V_A}{V_M} - 1\right)\right]$$

$$(5) \quad C_B = \frac{V_M - V_A}{V_B} \left[C_{EB} + C_{EA} \left(\frac{V_B}{V_M - V_A} - 1\right)\right]$$

$$(6) \quad C_C = \frac{V_M - V_A - V_B}{V_C} \left[C_{EC} + C_{EB} \left(\frac{V_C}{V_M - V_A - V_B} - 1\right)\right]$$

$$(7) \quad C_M = \frac{C_{EA} - C_A \frac{V_A}{V_M}}{1 - \frac{V_A}{V_M}}$$

In actual practice the calculated gradient curve is followed closely. For example, tests were run in a system formed with a 300 ml. mixing chamber and two 150 ml. storage chambers. The mixing chamber and the lower storage chamber initially were filled with water, and the upper storage chamber was filled with a 0.1 molar solution of KCl.

The gradient of the concentration of KCl in the effluent should form an inverted "V" rising to a maximum concentration after 300 ml. of flow and declining to zero at the end of 600 ml. of flow. Direct observation of the effluent, with a test for KCl content every 5 ml. confirmed the expected inverted "V" gradient with the measured values being close to theoretical. The observed values gripped against the theoretical gradient shows that the observed values as a whole had been displaced to the right (from theoretical) apparently because surface tension effects in the standpipe and outlet tubing retarded flow out of the storage chambers.

While the present invention has been described in terms of a preferred embodiment thereof and of preferred modes of operation, it should be appreciated that numerous changes therein as will occur to skilled workers in the art are contemplated within the scope of the appended claims.

What is claimed is:

1. A gradient generating device which comprises a vertically disposed mixing chamber and a multiplicity of smaller vertically disposed storage chambers, said mixing chamber and each of said storage chambers having the same uniform horizontal cross-sectional area, the individual storage chambers being smaller in fluid capacity than said mixing chamber by virtue of a lesser height, each said storage chamber being connected for fluid flow to mixing chamber, each storage chamber being disposed at a different relative elevation without overlap and all of them being elevationally disposed between the upper liquid level of said mixing chamber and the lower inside surface thereof, each storage chamber having a narrow vertical outlet higher than the maximum fluid level in the mixing chamber, and said mixing chamber and each storage chamber being under the same hydrostatic head when fluid filled.

2. The apparatus of claim 1 wherein each storage chamber has the same volumetric capacity and the total volumetric capacity of the storage chambers essentially equals the volumetric capacity of the mixing chamber.

3. The apparatus of claim 1 wherein the storage chambers and mixing chamber are aligned with the liquid level of the uppermost storage chamber and of the mixing chamber being the same, with the lower inside surface of the lowest storage chamber being in the same plane as the lower inside surface of the mixing chamber.

4. The apparatus of claim 3 wherein the lowermost inside surface of the highest storage chamber is in the same plane as the upper inside surface of the next lower storage chamber and the lower inside surface of said next lower storage chamber is in the same plane as the next succeeding storage chamber, with this above described relation existing for each of the lower storage chambers, whereby the total volumetric capacity of storage chambers being about equal to the capacity of the mixing chamber.

5. A gradient generating device which comprises a vertically disposed cylindrical mixing chamber and a multiplicity of vertically disposed cylindrical storage chambers, the mixing chamber and each storage chamber having the same cross-section, the individual storage chambers being smaller in fluid capacity than said mixing chamber by virtue of a lesser height, the relative elevation of each storage chamber being related with the uppermost storage chamber and said mixing chamber having the same liquid level therein and the storage chamber having its lower inside surface in essentially the same plane as the upper inside surface of the next lower storage chamber, with the above described chamber to chamber relation existing, for all of the storage chambers and with the lower inside surface of the lowermost storage chamber being essentially in the same plane as the lower inside surface of said mixing chamber, each storage chamber being individually connected for fluid flow therefrom to said mixing chamber, all of said storage chambers and mixing chamber being under the same hydrostatic head each storage chamber having the same fluid volume therein, and the total storage chambers fluid volume being equal to the fluid volume in the mixing chamber.

6. A device for generating stepwise gradients which comprises a plurality of vertically disposed storage chambers set at different relative elevations without overlap, each storage chamber having a narrow vertical standpipe extending higher than the maximum fluid level of the uppermost chamber, each storage chamber having a narrow discharge conduit with all discharge conduits leading to a manifolded common outlet line, and each storage chamber being under the same hydrostatic head when the device is fluid filled.

References Cited

UNITED STATES PATENTS

| | | | |
|---|---|---|---|
| 922,256 | 5/1909 | Callaway | 137—255 X |
| 3,131,710 | 5/1964 | Ludwig et al. | 137—255 |

FOREIGN PATENTS

| | | |
|---|---|---|
| 96,247 | 1/1937 | Sweden. |
| 679,553 | 8/1939 | Germany. |

M. CARY NELSON, *Primary Examiner.*

R. J. MILLER, *Assistant Examiner.*